United States Patent
Nakagawa et al.

(12)

(10) Patent No.: US 7,029,793 B2
(45) Date of Patent: Apr. 18, 2006

(54) NONAQUEOUS ELECTROLYTE LITHIUM SECONDARY CELL

(75) Inventors: Hiroe Nakagawa, Takatsuki (JP); Syuichi Izuchi, Takatsuki (JP); Takaaki Iguchi, Takatsuki (JP); Shigeru Sano, Takatsuki (JP); Kenichi Takeuchi, Takatsuki (JP); Keiichi Yamamoto, Osaka (JP); Hiroo Arai, Osaka (JP)

(73) Assignees: GS Yuasa Corporation, Kyoto (JP); The Kansai Electric Power Co., Inc., Osaka (JP)

( * ) Notice: Subject to any disclaimer, the term of this patent is extended or adjusted under 35 U.S.C. 154(b) by 305 days.

(21) Appl. No.: 10/275,769

(22) PCT Filed: May 10, 2001

(86) PCT No.: PCT/JP01/03883

§ 371 (c)(1),
(2), (4) Date: Nov. 8, 2002

(87) PCT Pub. No.: WO01/86748

PCT Pub. Date: Nov. 15, 2001

(65) Prior Publication Data

US 2003/0165737 A1     Sep. 4, 2003

(30) Foreign Application Priority Data

May 12, 2000 (JP) .............................. 2000-140097
Oct. 4, 2000 (JP) .............................. 2000-304776

(51) Int. Cl.
*H01M 4/58* (2006.01)

(52) U.S. Cl. .............................. 429/231.1; 429/231.5; 429/223; 429/103; 429/101; 429/231.95; 429/304; 429/322

(58) Field of Classification Search ................ 429/304, 429/188, 231.1, 322, 231.95, 231.5, 101, 429/103, 223

See application file for complete search history.

(56) References Cited

U.S. PATENT DOCUMENTS

| 4,507,371 | A | * | 3/1985 | Thackeray et al. | ......... | 429/322 |
| 5,552,238 | A | * | 9/1996 | Carlin et al. | ................ | 429/103 |
| 6,340,716 | B1 | * | 1/2002 | Armand et al. | ............. | 429/188 |

FOREIGN PATENT DOCUMENTS

| EP | 752728 | | 1/1996 |
| JP | 10-92467 | | 4/1998 |
| JP | 11-86905 | | 3/1999 |
| JP | 11-086905 | * | 3/1999 |
| JP | 11-260400 | | 9/1999 |
| JP | 11-297358 | | 10/1999 |
| JP | 11-339800 | | 12/1999 |
| JP | 11-345614 | | 12/1999 |

* cited by examiner

*Primary Examiner*—Laura Weiner
(74) *Attorney, Agent, or Firm*—Crowell & Moring LLP (57) ABSTRACT

A nonaqueous electrolyte lithium secondary cell comprising a positive electrode (1), a negative electrode (2) and a nonaqueous electrolyte containing a lithium salt is characterized by that the nonaqueous electrolyte contains a room temperature molten salt as a main component, a material wherein a working potential of the negative electrode (2) is nobler by above 1V than a potential of a metallic lithium is used for a negative active material of the negative electrode. This nonaqueous electrolyte lithium secondary cell has excellent safety and cell performance.

8 Claims, 7 Drawing Sheets

NONAQUEOUS ELECTROLYTE LITHIUM SECONDARY CELL

TECHNICAL FIELD

This invention relates to a nonaqueous electrolyte lithium secondary cell using a nonaqueous electrolyte which contains a room temperature molten salt.

BACKGROUND ART

In recent years, demands for high performance and small size are increasing in power sources for electrical and electric equipment, electric power storage facility and electric car etc., and tendency to accomplish a high energy density is strengthened. For this reason, the lithium secondary cell using various nonaqueous electrolytes is attracting public attention.

Generally in the lithium secondary cell, a lithium metallic oxide which absorbs and desorbs lithium ion is used for its positive electrode; a carbon material which absorbs and desorbs lithium ion, a lithium metal and a lithium alloy etc. are used for its negative electrode; and a liquid electrolyte formed by dissolving a lithium salt into an organic solvent under liquid-state at ordinary temperature is used for its electrolyte. The following materials may be mentioned as the organic solvent used for the electrolyte, i.e.: ethylene carbonate, propylene carbonate, dimethyl carbonate, diethyl carbonate, methyl ethyl carbonate, γ-butyrolactone, propiolactone, valerolactone, tetrahydrofuran, dimethoxy ethane, diethoxy ethane, methoxy ethoxy ethane etc.

However, the above-mentioned organic solvents are generally apt to vaporate and have high inflammability so that they are classified into a category of flammable material. Therefore, the foregoing lithium secondary cell and particularly a comparatively large lithium secondary cell used for power sources for storing electric power and electric car etc., have had problems in securing safety in case of abuse such as over-charging, over-discharging and short-circuiting, and in securing safety under high-temperature environment.

Under such circumstances, a lithium polymer secondary cell has been developed for a lithium secondary cell excellent in its safety and partially put into practical use as the power source for electrical and electric equipment. In the lithium polymer secondary cell, the lithium metallic oxide is used for the positive electrode; the carbon material which absorbs and desorbs lithium ion, lithium metal and lithium alloy etc. are used for the negative electrode; and the polymer electrolyte which contains a lithium salt is used for the electrolyte. The polymer electrolyte mentioned in this instance is that which contains at least the lithium salt and a polymer skeleton, and generally a gel substance containing the organic solvent is further developed therefor. The following materials may be mentioned as the polymer skeleton, i.e. polyethylene oxide, polypropylene oxide, polyacrylonitrile, methyl polymethacrylate, and polyvinylidene fluoride etc.

However, problems such as worsening of cycle characteristic and charging/discharging efficiency characteristic, have occurred in the above lithium polymer secondary cell. The reason is that, because of the solid-state electrolyte, a conductivity of lithium ion in the electrolyte is smaller than that of the liquid-state electrolyte. Therefore, it is generally difficult to keep a level of the conductivity of lithium ion in the electrolyte at $1 \times 10^{-3}$ S/cm. In addition, the gel polymer electrolyte containing the organic solvent has had problems in securing safety in case of abuse such as over-charging, over-discharging and short-circuiting etc. and in securing safety under high-temperature environment.

Under such circumstances, such nonaqueous electrolyte lithium secondary cells are proposed that do not contain the flammable substance such as the organic solvent as a main component, and is excellent in the safety. For example, in case of the nonaqueous electrolyte lithium secondary cells proposed in JP-A-4349365, JP-A-10092467, JP-A-11086905, and JP-A-11260400 etc., the lithium metallic oxide is used for the positive electrode; the carbon material which absorbs and desorbs the lithium ion, the lithium metal and the lithium alloy etc., are used for the negative electrode; and a substance containing a room temperature molten salt having quaternary ammonium organic cation and a lithium salt is used for the electrolyte. The foregoing nonaqueous electrolyte lithium secondary cells are excellent in securing the safety because the room temperature molten salt having the quaternary ammonium organic cation has almost no volatility even under its liquid-state at ordinary temperature and has inflammability or nonflammability.

DISCLOSURE OF INVENTION

However, problems such as worsening of cycle characteristic and charging/discharging efficiency characteristic have arisen in the above nonaqueous electrolyte lithium secondary cell. The reason may be considered as follows. The room temperature molten salt having the quaternary ammonium organic cation generally includes a comparatively noble reduction potential. On the other hand, a working potential of a negative active material of the nonaqueous electrolyte lithium secondary cell is ordinarily equal to a potential of metallic lithium (−3.045V vs. NHE in case of aqueous solution) and is very base. Therefore, the quaternary ammonium organic cation in the nonaqueous electrolyte and the negative active material themselves are reduced and decomposed. As a result, the cycle characteristic and charging/discharging efficiency characteristic become worse.

The nonaqueous electrolyte lithium secondary cell proposed in JP-A-4349365 has had the following problem. The cell performance is worsened due to corrosion behavior of aluminum ion halide ($AlCl_4^-$, for example) because the electrolyte contains aluminum halide. Further, the electrolyte is hard to be handled because the aluminum halide generally has violent reaction behavior.

This invention is made in consideration of the above-mentioned problems, and to provide a nonaqueous electrolyte lithium secondary cell having a high safety and an excellent cell performance.

An invention set forth in claim 1 provides a nonaqueous electrolyte lithium secondary cell comprising a nonaqueous electrolyte containing a lithium salt, a positive electrode, a negative electrode and a separator characterized by that; a material which contains a room temperature molten salt as a main component and is in liquid-state, is provided as the nonaqueous electrolyte, the negative electrode contains a negative active material wherein a working potential of the negative electrode is nobler by above 1V than a potential of the metallic lithium, and the foregoing liquid-state nonaqueous electrolyte is contained in the positive electrode, the negative electrode and the separator.

In the invention set forth in claim 1, the preferable characteristic of the room temperature molten salt: i.e. the characteristic having almost no volatility and having the inflammability or nonflammability even under the liquid-state at ordinary temperature, can be provided positively because the nonaqueous electrolyte contains the room temperature molten salt as its main component. Therefore, according to the invention set forth in claim 1, a high safety can be provided even in case of the abuse such as over-charging, over-discharging, short-circuiting, and under high-temperature environment. Further, since the nonaqueous electrolyte containing the room temperature molten salt has a high lithium ion conductivity, an excellent cell performance can be obtained.

Moreover, in the invention set force in claim 1, the negative electrode contains the negative active material wherein the working potential of the negative electrode is nobler by above 1V than the potential of the metallic lithium, so that an activity of the lithium in the negative active material under a charged state of cell becomes low as compared with the lithium in the metallic lithium and the carbon material. For this reason, a function to reduce and decompose the electrolyte etc. becomes very small. Therefore, according to the invention set forth in claim 1, excellent cycle characteristic and charging/discharging efficiency characteristic can be provided.

Each component of the invention set force in claim 1 will be described hereunder.

(i) The room temperature molten salt denotes a salt at least a part of which assumes liquid-state under an ordinary temperature. The ordinary temperature denotes a temperature range within which the cell is supposed to work normally. The temperature range within which the cell is supposed to work normally denotes a range from an upper limit of about 100° C. or about 60° C. when occasion demands, to a lower limit of about −50° C. or about −20° C. when occasion demands. Almost all of inorganic molten salts such as $Li_2CO_3$—$Na_2CO_3$—$K_2CO_3$ for use in various electric analyses as described in "Fundamental of Molten salt and Thermal Technology" (composed and written by Society for Study of Molten Salt and Thermal Technology), have a melting point of above 300° C. Therefore, they do not assumes the liquid-state within the temperature range in which the cell is supposed to work normally, so that they are not included in the room temperature molten salt in this invention.

(ii) A lithium salt generally used for the lithium secondary cell and stable in a wide potential region, is applied to the foregoing lithium salt. $LiBF_4$, $LiPF_6$, $LiClO_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$ and $LiC(C_2F_5SO_2)_3$ etc., for example, may be mentioned as the salt, but the salt is not limited to them. They may be used independently or in combination of two or more kinds.

(iii) A content of the lithium salt is preferably in a range from 0.1 to 3 mol/L, particularly in a range from 0.5 to 2 mol/L. The reason is that, a resistance of the nonaqueous electrolyte is excessively large to cause a decrease in the charging/discharging efficiency of cell when the content of lithium salt is smaller than 0.1 mol/L, and the melting point of nonaqueous electrolyte is increased to cause a difficulty in keeping the liquid-state at ordinary temperature when the content of lithium salt exceeds 3 mol/L.

(iv) A material wherein a working potential of the negative electrode is nobler by above 1V than a potential of the metallic lithium, is used for the negative active material. $WO_2$, $MoO_2$, $TiS_2$, and $Li_{4/3}Ti_{5/3}O_4$ etc., for example, may be used therefor. Particularly, a burnt oxide having a spinel type structure expressed by $Li_xTi_{5/3-y}L_yO_4$ (L is an element belonging to 2 to 16 groups of one or more kinds, and an element other than Ti and O, $4/3 \leq x \leq 7/3$, $0 \leq y \leq 5/3$) is preferable. They may be used independently or in combination of two or more kinds.

(v) Various lithium metallic oxides or metallic oxides, which are generally used for the lithium secondary cell and which absorb and desorb lithium ion, are used for the positive active material, but the material is not limited to these oxides. $LiCoO_2$, $LiNiO_2$, $LiFeO_2$, $LiNi_yCO_{1-y}O_2$, $LiMn_2O_4$, $MnO_2$, and $V_2O_5$ etc. for example, may used for the oxide, but the oxide is not limited to them. These substances may be used independently or in combination of two or more kinds.

(vi) The nonaqueous electrolyte of this invention may contain an organic solvent which is in liquid-state at ordinary temperature, in addition to the lithium salt and the room temperature molten salt. An organic solvent which is used in the organic solvent for use in liquid electrolyte for the lithium secondary cell, may be used as the foregoing organic solvent. Ethylene carbonate, propylene carbonate, dimethyl carbonate, diethyl carbonate, methyl ethyl carbonate, γ-butylolactone, propiolactone, valerolactone, tetrahydrofuran, dimethoxy ethane, diethoxy ethane, methoxy ethoxy ethane, etc. may be mentioned as the organic solvent but it is not limited to them. However, it is not desirable to contain these organic solvents to a large amount. Because, when an adding amount of the organic solvent is too large, the nonaqueous electrolyte will become inflammable due to the mentioned inflammability of the foregoing organic solvent, so that a sufficient safety would not be secured. Phosphoric ester forming a inflammability solvent, which is generally added to the liquid electrolyte for lithium secondary cell, may be also used. Trimethyl phosphate, triethyl phosphate, ethyl dimethyl phosphate, diethyl methyl phosphate, tripropyl phosphate, tributyl phosphate, tri(trifluoromethyl) phosphate, tri(trifluoroethyl) phosphate, tri(triperfluoroethyl) phosphate etc., may be mentioned as the phosphoric ester, but it is not limited to them. They may be used independently or in combination of two or more kinds.

An invention set forth in claim 2 provides a nonaqueous electrolyte lithium secondary cell comprising a nonaqueous electrolyte containing a lithium salt, a positive elctrode, a negative electrode and a separator characterized by that; a material which contains a room temperature molten salt as a main component and is in liquid-state, is provided as the nonaqueous electrolyte, a material which contains a room temperature molten salt as a main component and is in solid-state by combining a polymer, is provided as the nonaqueous electrolyte, the negative electrode contains a negative active material wherein a working potential of the negative electrode is nobler by above 1V than a potential of the metallic lithium, the foregoing liquid-state nonaqueous electrolyte is contained in the positive electrode and the negative electrode, and the foregoing solid-state nonaqueous electrolyte is contained in the separator.

According to the invention set forth in claim 2, the same effect as that of the invention set forth in claim 1 can be obtained, and at the same time the following effects (1) and (2) can be obtained.

(1) Since the nonaqueous electrolyte solidified into the gel by combining the polymer is contained in the separator, a fluidity of the nonaqueous electrolyte in the separator is controlled so that a possibility of liquid leakage can be made small. Consequently, the safety of cell can be improved more excellently according to the invention as set forth in claim 2.

(2) Since the positive electrode and the negative electrode contain the liquid-state nonaqueous electrolyte and do not contain the solid-state nonaqueous electrolyte, an ion oxidation/reduction reaction speed becomes large on a surface of the electrode active material in the positive electrode and the negative electrode, and an ion conduction phase prevails deeply into the porous electrode active material. Consequently, the cell performance can be kept at a sufficient high level and made stable, and its service life can be prolonged.

In the invention set forth in claim 2; the room temperature molten salt, the lithium salt, the content of lithium salt, the negative active material, the positive active material and the nonaqueous electrolyte, are the same as those of the claim 1.

In the invention set forth in claim 2; polyethylene oxide, polypropylene oxide, polyacrylonitryl, poly(methyl methacrylate), polyvinylidene fluoride, and polymers of acryl-group monomer, methacryl-group monomer, acrylamide-group monomer, aryl-group monomer, styrene-group monomer etc., may be mentioned as the combined polymer. However, the polymer is not limited to them. They may be used independently or in combination of two or more kinds. A method in which the nonaqueous electrolyte mixed with a monomer forming a composition unit of the polymer is impregnated in the separator and then the monomer is polymerized, is general for the combining means.

An invention set forth in claim 3 is characterized by that; in the invention set forth in claim 1 or claim 2, the positive electrode contains a positive active material wherein a working potential of the positive electrode is nobler by above 4.5V than a potential of the metallic lithium.

In the invention set forth in claim 3, since the positive electrode contains a positive active material wherein a working potential of the positive electrode is nobler by above 4.5V than a potential of the metallic lithium, the cell has a working voltage nobler than 3V even when the negative active material as set forth in claim 1 or claim 2 is used. Consequently, an excellent energy density can be obtained according to the invention set forth in claim 3.

In the invention set forth in claim 3, a material wherein a working potential of the positive electrode is nobler by above 4.5V than the potential of metallic lithium can be used as the positive active material. $LiCoVO_4$. $LiCr_xMn_{2-x}O_4$, $LiNiVO_4$, $LiNi_xMn_{2-x}O_4$, $Li_{2-x}CoMn_3O_8$ etc., for example, may be used. Particularly, it is preferable to use a burnt oxide having a spinel type structure expressed by $Li_m[Ni_{2-n}M_nO_4]$ (M is a transition metal of one or more kinds and an element other than Ni, $0 \leq m \leq 1.1$, $0.75 \leq n \leq 1.80$). They may be used independently or in combination of two or more kinds.

An invention set forth in claim 4 is characterized by that; in the invention set forth in claim 1 or claim 2, the room temperature molten salt contains a quaternary ammonium organic cation having a skeleton expressed by a Chemical formula (I).

Chemical formula (I)

In the invention set forth in claim 4, the preferable characteristic of the room temperature molten salt: i.e. the characteristic having almost no volatility and having the inflammability or nonflammability even under liquid-state at ordinary temperature, can be provided positively. Therefore, according to the invention set forth in claim 4, high safety can be secured even in case of the abuse such as over-charging, over-discharging, short-circuiting, and under high-temperature environment.

In the invention set forth in claim 4, imidazolium ions such as dialkyl imidazolium ion and trialkyl imidazolium ion etc., and tetraalkyl ammonium ion, alkyl pyridinium ion, alkyl pyrazolium ion, alkyl pyrrolium ion, alkyl pyrrolinium ion, alkyl pyrrolidium ion and alkyl piperidinium ion etc. may be mentioned as the quaternary ammonium organic cation having the skeleton expressed by the Chemical formula (I).

In this instance, trimethl ethyl ammonium ion, trimethy propyl ammonium ion, trimethy hexyl ammonium ion, tetrapentyl ammonium ion etc. may be mentioned as the tetraalkyl ammonium ion. However, the ion is not limited to them.

N-methyl pyridinium ion, N-ethyl pyridinium ion, N-propyl pyridinium ion, N-butyl pyridinium ion, 1-ethyl-2-methyl pyridinium ion, 1-butyl-4-methyl pyridinium ion, 1-butyl-2,4-dimethyl pyridinium ion etc. may be mentioned as the alkyl pyridinium ion. However, the ion is not limited to them.

These room temperature molten salts having the cation may be used independently or in combination of two or more kinds.

An invention set forth in claim 5 is characterized by that; in the invention set forth in claim 4, the room temperature molten salt contains an imidazolium cation having a skeleton expressed by a Chemical formula (II).

Chemical formula (II)

(R1, R2: $C_nH_{2n+1}$, n = 1 ~ 6
R3: H or $C_nH_{2n+1}$, n = 1 ~ 6)

(R1, R2: $C_nH_{2n+1}$, $n$=1~6
R3: H or $C_nH_{2n+1}$, $n$=1~6)

In the invention set forth in claim 5, the preferable characteristic of the room temperature molten salt: i.e. the characteristic having almost no volatility and having the inflammability or nonflammability even under liquid-state at ordinary temperature, can be provided effectively. Further, a sufficient mobility of lithium ion in the nonaqueous electrolyte can be obtained. Therefore, according to the invention set forth in claim 5, high safety can be secured even in case of the abuse such as over-charging, over-discharging, short-circuiting, and under high-temperature environment. Moreover, an excellent cell performance can be obtained owing to the sufficient mobility of lithium ion in the nonaqueous electrolyte.

In the imidazolium cation of the invention set forth in claim 5; 1,3-dimethyl imidazolium ion, 1-ethyl-3-methyl imidazolium ion, 1-methyl-3-ethyl imidazolium ion, 1-methyl-3-butyl imidazolium ion, 1-butyl-3-methyl imidazolium ion, etc. may be mentioned as the dialkyl imidazolium ion. 1,2,3-trimethyl imidazolium ion, 1,2-dimethyl-3-ethyl imidazolium ion, 1,2-dimethyl-3-propyl imidazolium ion, 1-butyl-2,3-dimethyl imidazolium ion, etc. may be mentioned as the trialkyl imidazolium ion. However, the ion is not limited to them.

Incidentally, these room temperature molten salts having the cation may be used independently or in combination of two or more kinds.

An invention set forth in claim 6 is characterized by that, in the invention set forth in claim 1 or claim 2, the main component of the negative active material comprises the burnt oxide having the spinel type structure expressed by $Li_xTi_{5/3-y}L_yO_4$ (L is an element belonging to 2 to 16 groups of one or more kinds, and an element other than Ti and O, $4/3 \leq x \leq 7/3$, $0 \leq y \leq 5/3$)

In the invention set forth in claim 6, the working potential of the negative electrode becomes nobler by about 1.5V than the potential of metallic lithium and an activity of the lithium in the negative active material under charged condition of cell becomes low as compared with the lithium in the metallic lithium and carbon material so that the function to reduce and decompose the electrolyte etc. becomes very small. Consequently, more excellent cycle characteristic and charging/discharging efficiency characteristic can be obtained according to the invention as set forth in claim 6.

The burnt oxide having the spinel type structure expressed by $Li_xTi_{5/3-y}L_yO_4$ (L is an element belonging to 2 to 16 groups of one or more kinds, and an element other than Ti and O, $4/3 \leq x \leq 7/3$, $0 \leq y \leq 5/3$) of the invention set forth in claim 6, will be explained hereunder. Be, B, C, Mg, Al, Si, P, Ca, Sc, V, Cr, Mn, Fe, Co, Ni, Cu, Zn, Ga, Ge, As, Se, Sr, Y, Zr, Nb, Mo, Pd, Ag, Cd, In, Sn, Sb, Te, Ba, La, Ta, W, Au, Hg and Pd etc., in concrete, may be mentioned as the substitution element L. However, the element is not limited to them. These negative active materials may be used independently or in combination of two or more kinds.

An invention set forth in claim 7 is characterized by that, in the invention set forth in claim 1 or claim 2, the main component of the positive active material comprises the burnt oxide having the spinel type structure expressed by $Li_m[Ni_{2-n}M_nO_4]$ (M is a transition metal of one or more kinds and an element other than Ni, $0 \leq m \leq 1.1$, $0.75 \leq n \leq 1.80$)

In the invention set forth in claim 7, the working potential of the positive electrode becomes nobler by about 4.7 to 4.8V than a potential of the metallic lithium, so that the cell provides a working voltage of about 3.2 to 3.3V even when a material wherein a working potential of the negative electrode is nobler by about 1.5V than the potential of metallic lithium is used for the negative active material. Consequently, more excellent energy density can be obtained according to the invention as set forth in claim 7.

In the burnt oxide having the spinel type structure expressed by $Li_m[Ni_{2-n}M_nO_4]$ (M is a transition metal of one or more kinds and an element other than Ni, $0 \leq m \leq 1.1$, $0.75 \leq n \leq 1.80$) of the invention as set forth in claim 7; Mn, Co, Zn, Fe and V etc. may be mentioned as the substitution element M. However, the element is not limited to them. These positive active materials may be use independently or in combination of two or more kinds.

Incidentally, $Li_m[Ni_{2-n}M_nO_4]$ forming the positive active material has the spinel type structure with conditions of $0 \leq m \leq 1.1$ and $0.75 \leq n \leq 1.80$, so that it has a stable crystal structure.

BEST MODE FOR CARRYING OUT THE INVENTION

Embodiments of the present invention will be described hereunder, however, the present invention is not limited to these embodiments.

EMBODIMENT 1

Figure 1:
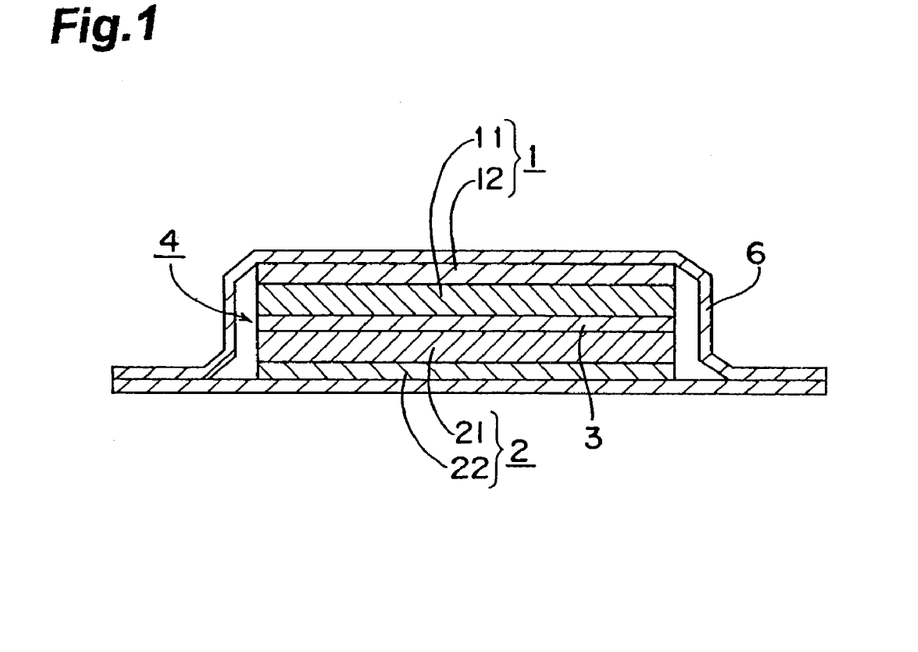
FIG. 1 is a sectional view of the nonaqueous electrolyte lithium secondary cell according to the present invention.

FIG. 1 is the sectional view of the nonaqueous electrolyte lithium secondary cell according to the present invention.

This nonaqueous electrolyte lithium secondary cell is composed of an assembled element 4 comprising a positive electrode 1, a negative electrode 2 and a separator 3; a nonaqueous electrolyte; and a metal resin composite film 6. The positive electrode 1 is so formed that a cathode composite 11 is coated on one surface of a positive current collector 12. The negative electrode 2 is so formed that an anode composite 21 is coated on one surface of a negative current collector 22. The separator 3 is composed of a micro porous membrane made of polyethylene. The nonaqueous electrolyte is in liquid-state and contained in the cathode composite 11, the anode composite 21 and the separator 3. The metal resin composite film 6 covers the assembled element 4, and is thermally jointed at its four sides to seal the assembled element 4.

A method of manufacturing the nonaqueous electrolyte lithium secondary cell having the above structure will be described hereunder.

The positive electrode 1 was prepared as follows.

First, $LiCoO_2$ forming the positive active material was mixed with acetylene black forming a conductive material. Next, this mixture was mixed with N-methyl-2-pyrrolidone solution of polyvinylidene fluoride forming a binder. Then, this mixture was coated on the positive current collector 12 made of an aluminum foil, dried and pressed so as to become a thickness of 0.1 mm. Thus, the positive electrode 1 formed by coating the cathode composite 11 on the positive current collector 12 was prepared.

The negative electrode 2 was prepared as follows.

First, $TiO_2$ was mixed with $LiOH.H_2O$, the mixture was subjected to thermal treatment for 10 hours under oxidation atmosphere at 900° C. so that $Li_{4/3}Ti_{5/3}O_4$ forming the negative active material was obtained. A crystal of the obtained $Li_{4/3}Ti_{5/3}O_4$ had the spinel structure.

Next, $Li_{4/3}Ti_{5/3}O_4$ forming the negative active material was mixed with ketchen black forming the conductive material, and this mixture was mixed with N-methyl-2-pyrrolidone solution of polyvinylidene fluoride forming a binder. Then, this mixture was coated on one surface of the negative current collector 22 made of an aluminum foil, dried and pressed so as to become a thickness of 0.1 mm. Thus, the negative electrode 2 formed by coating the anode composite 21 on the negative current collector 22 was prepared.

The assembled element 4 was so composed that the cathode composite 11 and the anode composite 21 were put oppositely each other; the separator was disposed between them; and the negative electrode 2, the separator 3 and the positive electrode 1 were laminated.

The liquid-state nonaqueous electrolyte was obtained as follows. 1 mol of $LiBF_4$ was dissolved in 1 liter(L) of room temperature molten salt ($EMIBF_4$) comprising 1-ethyl-3-methyl imidazolium ion ($EMI^+$) and tetrafluoroborate ion ($BF_4^-$).

Then, the liquid-state nonaqueous electrolyte was impregnated in the cathode composite 11, the anode composite 21 and the separator 3 by dipping the assembled element 4 into the liquid-state nonaqueous electrolyte.

A cell thus prepared is designated as an invention cell P1. A design capacity of the invention cell P1 is 10 mAh.

EMBODIMENT 2

1 mol of $LiBF_4$ was dissolved in 1 L of room temperature molten salt ($BPyBF_4$) comprising N-butylpiridinium ion ($BPy^+$) and $BF_4^-$, and this material was used for the nonaqueous electrolyte. The other procedure was the same as that of the invention cell P1, so that a nonaqueous electrolyte lithium secondary cell was prepared. This cell is designated as an invention cell P2.

EMBODIMENT 3

$Li_{4/3}Ti_{4/3}B_{1/3}O_4$ was used for the negative active material, and the other procedure was the same as that of the invention cell P1. Thus, a nonaqueous electrolyte lithium secondary cell was prepared. This cell is designated as an invention cell P3.

COMPARISON EXAMPLE 1

1 mol of $LiBF_4$ was dissolved in 1 L of a mixed solvent comprising ethylene carbonate and diethyl carbonate which are mixed together by a volume ratio of 1:1, and this material was used for the nonaqueous electrolyte. The other procedure was the same as that of the invention cell P1, so that a nonaqueous electrolyte lithium secondary cell was prepared. This cell is designated as a comparison cell C1.

COMPARISON EXAMPLE 2

A graphite was used for the negative active material, and the other procedure was the same as that of the invention cell P1. Thus, a nonaqueous electrolyte lithium secondary cell was prepared. This cell is designated as a comparison cell C2.

(Performance Test)

(1) Charge/Discharge Cycle Test

The invention cells P1, P2 & P3 and the comparison cells C1 & C2 were subjected to the charge/discharge cycle test.

[Test Condition]

The test was carried out at a test temperature of 20° C. Charging was done with a constant current of 1 mA; with a final voltage of 2.6V for the invention cells P1, P2 & P3 and the comparison cell C1, and a final voltage of 4.1V for the comparison cell C2. Discharging was done with a constant current of 1 mA; with a final voltage of 1.2V for the invention cells P1, P2 & P3 and the comparison cell C1, and a final voltage of 2.7V for the comparison cell C2.

[Result]

Figure 2:
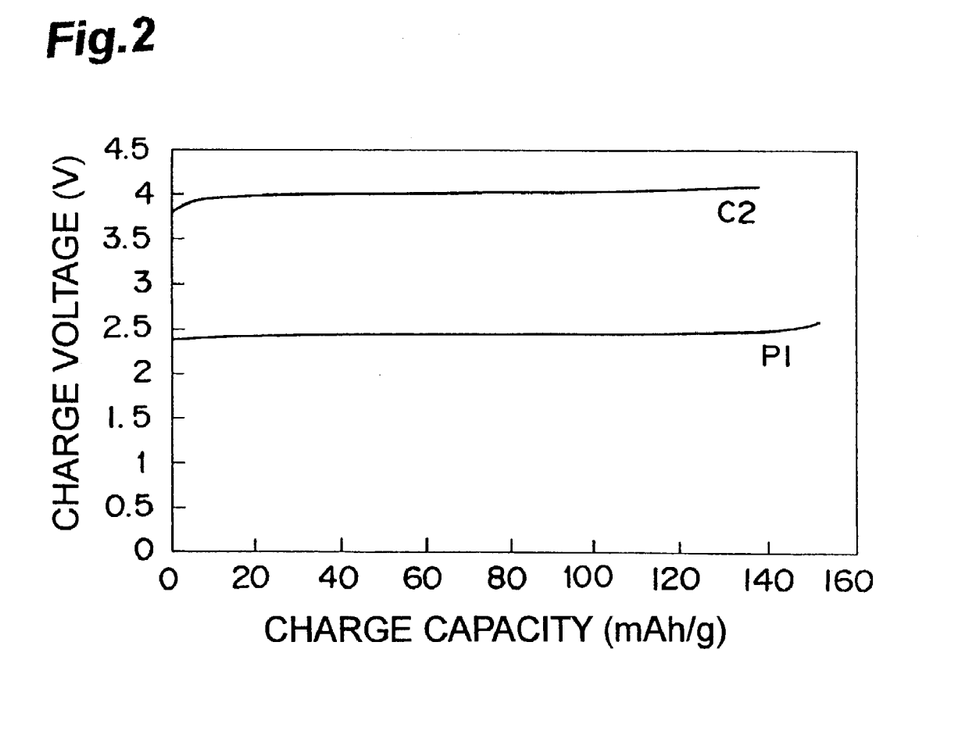
FIG. 2 is a diagram showing charge curves at initial stage of cycle for an invention cell P1 and a comparison cell C2.
Figure 3:
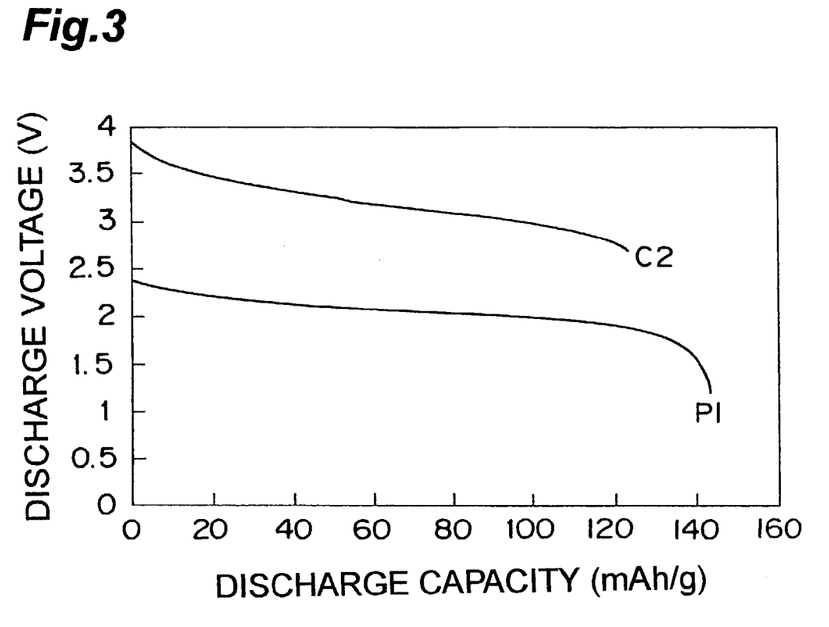
FIG. 3 is a diagram showing discharge curves at initial stage of cycle for an invention cell P1 and a comparison cell C2.
Figure 4:
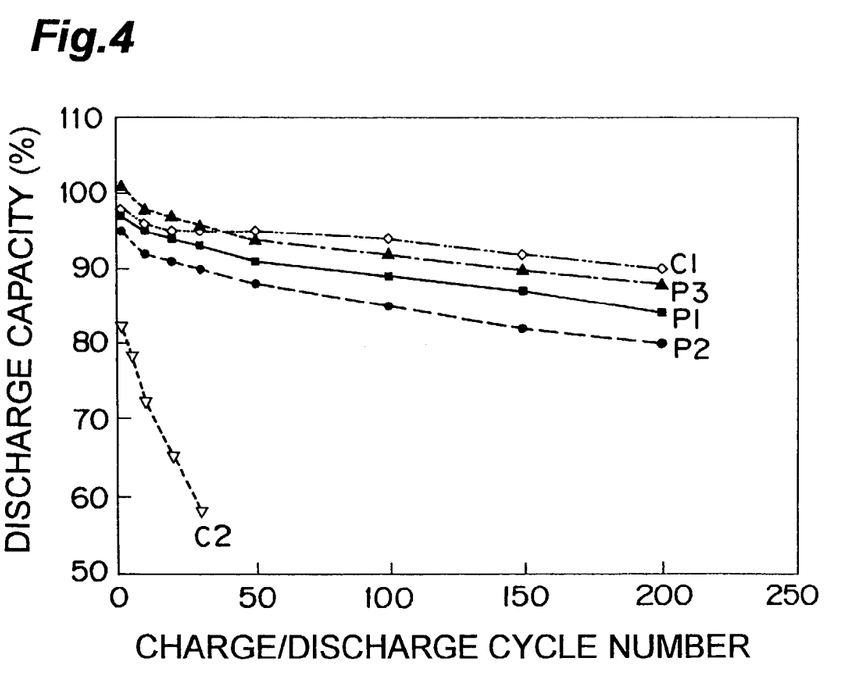
FIG. 4 is a diagram showing charge/discharge cycle characteristics for invention cells P1, P2 & P3 and comparison cells C1 & C2.

FIG. 2 shows charge curves at initial stage of cycle for the invention cell P1 and the comparison cell C2. FIG. 3 shows discharge curves at initial stage of cycle for the invention cell P1 and the comparison cell C2. FIG. 4 shows charge/discharge cycle characteristics for invention cells P1, P2 & P3 and comparison cells C1 & C2. A discharge capacity (%) means a ratio of a measured capacity to a cell design capacity.

As seen from FIG. 4, the comparison cell C2 provides the discharge capacity of only about 80% even at the initial stage of charging and discharging, and the discharge capacity suddenly lowers with an increase in a cycle number and dropped below 60% at $30^{th}$ cycle. On the other hand, the invention cells P1, P2 & P3 and the comparison cell C1 not only provide the discharge capacity of about 100% from the initial stage of charging and discharging, but could keep a discharge capacity of above 80% even after completion of 200 cycles.

In the comparison cell C2, since the graphite forming one of carbon material is used for the negative active material, a working potential of the negative electrode is equal to a potential of the metallic lithium (−3.045V vs. NHE in case of aqueous solution) and is very base. For this reason, the lithium in the negative active material under a charging condition of cell presents a high activity so as to reduce and decompose the quaternary ammonium organic cation and the negative active material itself. As a result, the cycle characteristic and charge/discharge efficiency characteristic are worsened.

While, since the burnt oxide having the spinel type structure expressed by $Li_xTi_{5/3-y}L_yO_4$ is used for the negative active material in case of the invention cells P1, P2 & P3 and the comparison cell C1, the working potential of the negative electrode is nobler by about 1.5V than the potential of the metallic lithium. Therefore, the lithium in the negative active material under the charging condition of cell presents a low activity, as compared with the lithium in the metallic lithium and the carbon material, so that the function to reduce and decompose the electrolyte etc. became very small. Consequently, good cycle characteristic and charge/discharge efficiency characteristic could be obtained.

(2) High-temperature Storage Test

The invention cells P1, P2 & P3 and the comparison cells C1 & C2 were subjected to the high-temperature storage test.

[Test Condition]

First, an initial discharge capacity was measured using the same condition as that of the charge/discharge cycle test, and the measured value was named as "Discharge capacity before high-temperature storage". A thickness of the cell was measured and the measured value was named as "Cell thickness before high-temperature storage". Next, the charging was done using the same charging condition as that of the foregoing charge/discharge cycle test, then high-temperature storage cycles were repeated for 30 days, wherein after the cell was stored for 3 hours at 100° C. and then stored for 21 hours at room temperature. The discharge capacity was measured using the same condition as that of the charge/discharge cycle test, and the measured value was named as "Discharge capacity after high-temperature storage". Further, the cell thickness was measured and the measured value was named as "Cell thickness after high-temperature storage". Then, a self-discharge rate was calculated and a change of cell thickness was measured. The self-discharge rate was calculated by an Equation (A) and the change of cell thickness was calculated by an Equation (B).

$$\text{Self-discharge rate (\%)} = \left(1 - \frac{\text{Discharge capacity after high-temperature storage}}{\text{Discharge capacity before high-temperature storage}}\right) \times 100 \quad \text{Equation (A)}$$

$$\text{Change of cell thickness (\%)} = \frac{\text{Cell thickness after high-temperature storage}}{\text{Cell thickness before high-temperature storage}} \times 100 \quad \text{Equation (B)}$$

[Result]

Table 1 shows results of the high-temperature storage test. As seen from Table 1, the comparison cell C1 presents not only a high self-discharge rate but also a large change of cell thickness. On the contrary, the invention cells P1, P2 & P3 and the comparison cell C2 presents not only a comparatively low self-discharge rate but also little change of cell thickness.

TABLE 1

| Cell | Discharge capacity before storage | Self-discharge rate | Change of cell thickness |
|---|---|---|---|
| Invention cell P1 | 9.7 mAh | 12.2% | +10% |
| Invention cell P2 | 9.5 mAh | 15.3% | +15% |
| Invention cell P3 | 10.1 mAh | 10.8% | +5% |
| Comparison cell C1 | 9.8 mAh | 60.5% | +320% |
| Comparison cell C2 | 8.2 mAh | 25.8% | +30% |

(3) Heating Test

The invention cells P1, P2 & P3 and the comparison cells C1 & C2 were subjected to the heating test.

[Test Condition]

The cells were checked for their initial charge capacities using the same condition as that of the charge/discharge cycle test. They were forcedly subjected to over-charging for 9 hours with a current of 10 mA, and then burnt at a position about 2 cm above a gas burner.

[Result]

In the comparison cell C1, the metal resin composite film 6 was burnt and the electrolyte caught fire to cause an explosive burning. On the contrary, in the invention cells P1, P2 & P3 and the comparison cell C2, the metal resin composite film 6 was burnt but no burning occurred on the electrolyte.

In the comparison cell C1, a material wherein 1 mol of $LiBF_4$ is dissolved in 1 L of mixed solvent formed by mixing ethylene carbonate and diethyl carbonate with a volume ratio of 1:1, is used for the nonaqueous electrolyte. These organic solvents are apt to vaporate and easily change to gas by the high-temperature storage. This phenomenon is supposed to be the cause not only of the high self-discharge rate but of the large change of cell thickness. Further, since these organic solvents have a high inflammability, the safety of cell is worsened in case of the abuse such as over-charging, over-discharging and short-circuiting etc. and under a high-temperature environment.

While, in the invention cells P1, P2 & P3 and the comparison cell C2, the room temperature molten salts such as $EMIBF_4$ and $BPyBF_4$ etc. are used for the nonaqueous electrolyte. These room temperature molten salts present little volatility even in the liquid-state at ordinary temperature, and is scarcely gasified even by the high-temperature storage. This fact is supposed to be the cause not only of the comparatively low self-discharge rate but also of the little change in the cell thickness. Moreover, these room temperature molten salts have the inflammability or nonflammability so as to improve the safety even in case of the abuse such as over-charging, over-discharging and short-circuiting etc. and under a high-temperature environment.

(Conclusion)

Effects as mentioned above can be obtained synergistically, so that the good safety and the excellent performance can be obtained in the invention cells P1, P2 & P3 as compared with the comparison cells C1 & C2.

EMBODIMENT 4

A nonaqueous electrolyte lithium secondary cell of this embodiment has the same fundamental structure as that of the Embodiment 1. As shown in FIG. 1, the cell is composed of the assembled element 4 comprising the positive electrode 1, the negative electrode 2 and the separator 3; the nonaqueous electrolyte; and the metal resin composite film 6. The positive electrode 1 is so formed that the cathode composite 11 is coated on one surface of the positive current collector 12. The negative electrode 2 is so formed that the anode composite 21 is coated on one surface of the negative current collector 22. The separator 3 is composed of a micro porous membrane made of polyethylene. The nonaqueous electrolyte is in liquid-state and contained in the cathode composite 11, the anode composite 21 and the separator 3. The metal resin composite film 6 covers the assembled element 4, and is thermally jointed at its four sides to seal the assembled element 4.

A method of manufacturing the nonaqueous electrolyte lithium secondary cell having the above structure will be described hereunder.

The positive electrode 1 was prepared as follows.

First, $Ni(OH)_2$ was mixed with $MnCO_3$ and $LiOH.H_2O$. The mixture was thermally treated for 20 hours under an atmosphere of dry air at 750° C., so that $LiMn_{1.5}Ni_{0.5}O_4$ forming the positive active material was obtained. A crystal of the obtained $LiMn_{1.5}Ni_{0.5}O_4$ assumed the spinel type structure.

Next, $LiMn_{1.5}Ni_{0.5}O_4$ forming the positive active material was mixed with acetylene black forming the conductive material, and this mixture was mixed with N-methyl-2-pyrrolidone of polyvinylidene fluoride forming the binder. Then, this mixture was coated on one surface of the positive current collector 12 made of an aluminum foil, dried and pressed so as to become a thickness of 0.1 mm. Thus the positive electrode 1 formed by coating the cathode composite 11 on the positive current collector 12 was prepared.

The negative electrode 2 was prepared in the same procedure as that of the Embodiment 1.

The assembled element 4 was prepared also in the same procedure as that of the Embodiment 1.

The liquid-state nonaqueous electrolyte was prepared also in the same procedure as that of the Embodiment 1.

The liquid-state nonaqueous electrolyte was impregnated into the cathode composite 11, the anode composite 21 and the separator 3 by dipping the assembled element 4 in the liquid-state nonaqueous electrolyte.

An invention cell thus prepared is designated as an invention cell P4. A design capacity of the invention cell P4 is 10 mAh.

EMBODIMENT 5

1 mol of $LiBF_4$ was dissolved in 1 L of room temperature molten salt ($BPyBF_4$) comprising N-butylpiridinium ion ($BPy^+$) and $BF_4^-$, and this material was used for the non-aqueous electrolyte. The other procedure was the same as that of the invention cell P4, so that a nonaqueous electrolyte lithium secondary cell was prepared. This cell is designated as an invention cell P5.

EMBODIMENT 6

$Li_{4/3}Ti_{4/3}B_{1/3}O_4$ was used for the negative active material, and the other procedure was the same as that of the invention cell P4. Thus, a nonaqueous electrolyte lithium secondary cell was prepared. This cell is designated as an invention cell P6.

COMPARISON EXAMPLE 3

1 mol of $LiBF_4$ was dissolved in 1 L of mixed solvent comprising ethylene carbonate and diethyl carbonate which are mixed together by a volume ratio of 1:1, and this material was used for the nonaqueous electrolyte. The other procedure was the same as that of the invention cell P4, so that a nonaqueous electrolyte lithium secondary cell was prepared. This cell is designated as a comparison cell C3.

COMPARISON EXAMPLE 4

A graphite was used for the negative active material, and the other procedure was the same as that of the invention cell P4. Thus, a nonaqueous electrolyte lithium secondary cell was prepared. This cell is designated as a comparison cell C4.

(Performance Test)

(1) Charge/Discharge Cycle Test

The invention cells P4, P5 & P6 and the comparison cells C3 & C4 were subjected to the charge/discharge cycle test.

[Test Condition]

The test was carried out at a test temperature of 20° C. Charging was done with a constant current of 1 mA; with a final voltage of 3.5V for the invention cells P4, P5 & P6 and the comparison cell C3, and a final voltage of 5.0V for the comparison cell C4. Discharging was done with a constant current of 1 mA: with a final voltage of 2.7V for the invention cells P4, P5 & P6 and the comparison cell C3, and a final voltage of 4.2V for the comparison cell C4.

[Result]

Figure 5:
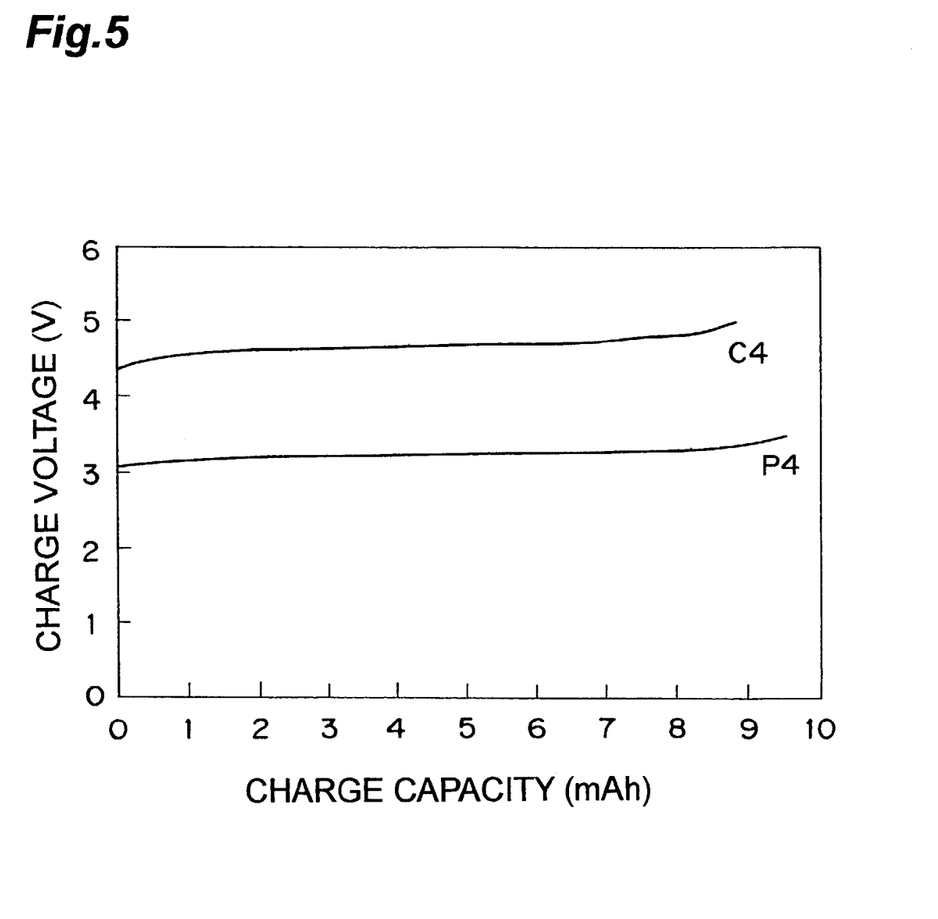
FIG. 5 is a diagram showing charge curves at initial stage of cycle for an invention cell P4 and a comparison cell C4.
Figure 6:
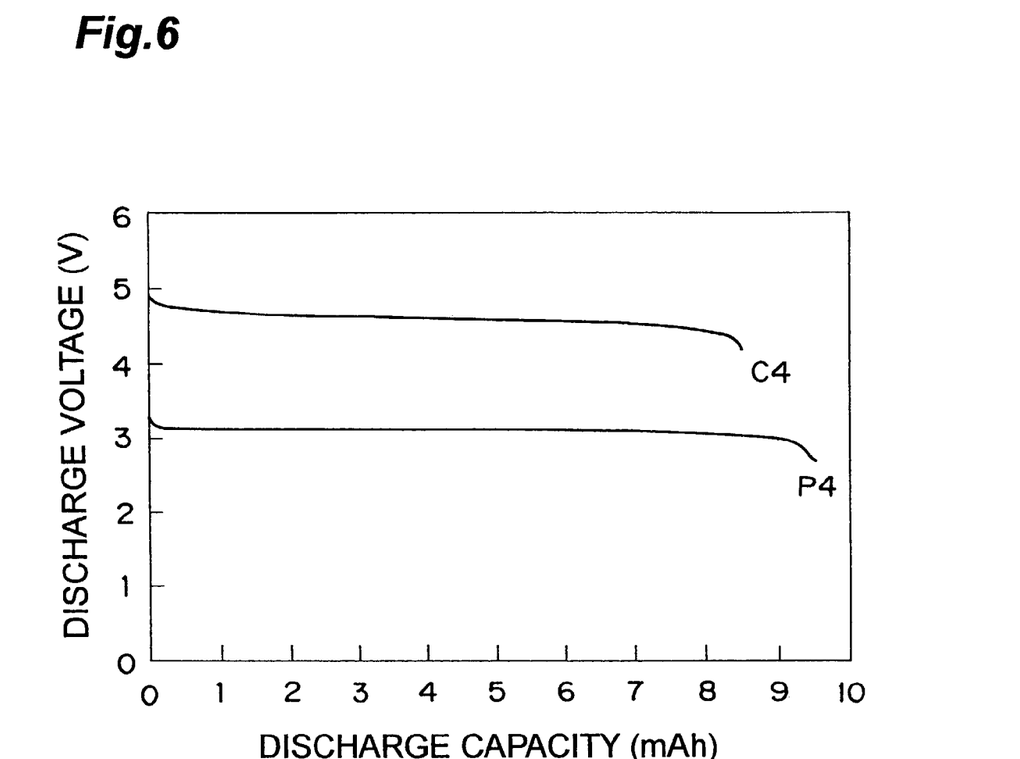
FIG. 6 is a diagram showing discharge curves at initial stage of cycle for an invention cell P4 and a comparison cell C4.
Figure 7:
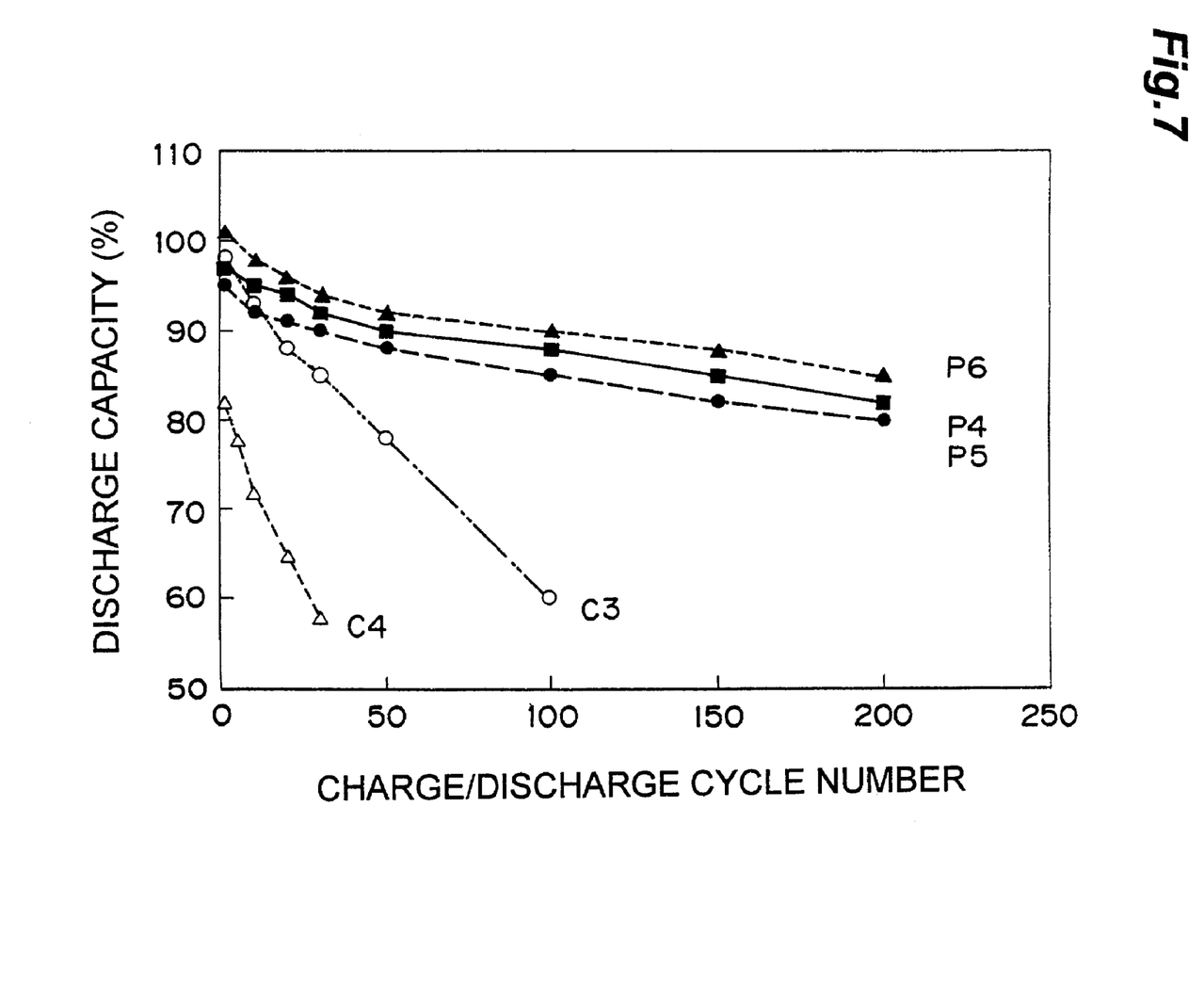
FIG. 7 is a diagram showing charge/discharge cycle characteristics for invention cells P4, P5 & P6 and comparison cells C3 & C4.

FIG. 5 shows charge curves at initial stage of cycle for the invention cell P4 and the comparison cell C4. FIG. 6 shows discharge curves at initial stage of cycle for the invention cell P4 and the comparison cell C4. FIG. 7 shows charge/discharge cycle characteristics for the invention cells P4, P5 & P6 and the comparison cells C3 & C4. A discharge capacity (%) means a ratio of a measured capacity to a cell design capacity.

As seen from FIG. 5 and FIG. 6, the comparison cell C4 provides a high discharge mean voltage as 4.5V, but provides a discharge capacity of only about 80% and a charge/discharge efficiency of about 85%. On the other hand, the invention cell P4 provides a discharge capacity of about 100% and a charge/discharge efficiency of about 100%, and provides a high discharge mean voltage as 3.2V.

While, as seen from FIG. 7, the comparison cell C4 provides a discharge capacity of only about 80% even at the initial stage of charging and discharging, the discharge capacity suddenly lowers with an increase in a cycle number and drops below 60% at $30^{th}$ cycle. The comparison cell C3 provides a discharge capacity of about 100% at the initial stage of charging and discharging, but the discharge capacity gradually lowers with an increase in a cycle number and drops below 60% at $100^{th}$ cycle. On the other hand, the invention cell P4, P5 & P6 not only provide a discharge capacity of about 100% from the initial stage of charging and discharging, but can keep a discharge capacity of above 80% even after completion of 200 cycles.

The reason of this fact can be supposed as follows.

In the comparison cell C4, since a graphite which is one of the carbon material is used for the negative active material, a working potential of the negative electrode is equal to a potential of the metallic lithium (−3.045V vs. NHE in case of aqueous solution) and is very base. For this reason, the lithium in the negative active material under a charging condition of cell exerts a high activity so as to reduce and decompose the quaternary ammonium organic cation in the electrolyte and the negative active material itself. As a result, the cycle characteristic and charge/discharge efficiency characteristic are worsened.

In the comparison cell C3, since $LiMn_{1.5}Ni_{0.5}O_4$ is used for the positive active material, the working potential of the positive electrode is nobler by about 4.7V than the potential of metallic lithium and is very noble. However, the material is used for the nonaqueous electrolyte, wherein 1 mol of $LiBF_4$ is dissolved in 1 L of mixed solvent formed by mixing ethylene carbonate and diethyl carbonate with a volume ratio of 1:1. Therefore, the solvent in the nonaqueous is oxidized and reduced electrolyte under charged condition of cell. Consequently, the cycle characteristic and charge/discharge efficiency characteristic are worsened.

While, since the burnt oxide having the spinel type structure expressed by $Li_xTi_{5/3-y}L_yO_4$ is used for the negative active material in case of the invention cells P4, P5 & P6, the working potential of the negative electrode is nobler by about 1.5V than the potential of the metallic lithium. Therefore, the lithium in the negative active material under the charging condition of cell exerts a low activity, as compared with the lithium in the metallic lithium and the carbon material, so that the function to reduce and decompose the electrolyte etc. becomes very small. Consequently, good cycle characteristic and charge/discharge efficiency characteristic can be obtained.

In the invention cells P4, P5 & P6 and the comparison cells C3 & C4; since $LiMn_{1.5}Ni_{0.5}O_4$ is used for the positive active material, the working potential of the positive electrode is nobler by about 4.7V than the potential of metallic lithium. The cell mean discharge voltage becomes such a large value as: 3.2V in the invention cells P4, P5 & P6 and the comparison cell C3, and as 4.5V in the comparison cell C4. For this reason, a high energy density can be obtained.

(2) High-temperature Storage Test

The invention cells P4, P5 & P6 and the comparison cells C3 & C4 were subjected to the same high-temperature storage test as described above.

[Result]

Table 2 shows results of the high-temperature storage test. As seen from Table 2, the comparison cell C3 presents not only a high self-discharge rate but also a large change of cell thickness. On the contrary, the invention cells P4, P5 & P6 and the comparison cell C4 presents not only a comparatively low self-discharge rate but also little change of cell thickness.

TABLE 2

| Cell | Discharge capacity before storage | Self-discharge rate | Change of cell thickness |
|---|---|---|---|
| Invention cell P4 | 9.7 mAh | 11.8% | +10% |
| Invention cell P5 | 9.5 mAh | 15.3% | +15% |
| Invention cell P6 | 10.1 mAh | 10.8% | +5% |
| Comparison cell C3 | 9.8 mAh | 60.5% | +320% |
| Comparison cell C4 | 8.2 mAh | 25.8% | +30% |

(3) Heating Test

The invention cells P4, P5 & P6 and the comparison cells C3 & C4 were subjected to the same heating test as described above.

[Result]

In the comparison cell C3, the aluminum laminated film was burnt and the electrolyte caught fire to cause an explosive burning. On the contrary, in the invention cells P4, P5 & P6 and the comparison cell C4, the aluminum laminated film was burnt but no burning arose on the electrolyte.

In the comparison cell C3, the material is used for the nonaqueous electrolyte, wherein 1 mol of $LiBF_4$ was dissolved in 1 L of mixed solvent formed by mixing ethylene carbonate and diethyl carbonate with a volume ratio of 1:1. These organic solvents are apt to vaporate and easily changed to gas under the high-temperature storage. For this reason, the self-discharge rate becomes high and the change of the cell thickness becomes large. Further, since these organic solvents have a high inflammability, the nonaqueous electrolyte is easily burnt by the heating test. Therefore, in the comparison cell C3, the safety of cell is not sufficient in case of the abuse such as over-charging, over-discharging and short-circuiting etc. and under a high-temperature environment.

While, in the invention cells P4, P5 & P6 and the comparison cell C4, the room temperature molten salts such as $EMIBF_4$ and $BPyBF_4$ etc. is used for the nonaqueous electrolyte. These room temperature molten salts present little volatility even in liquid-state at ordinary temperature, and are scarcely gasified even by the high-temperature storage. For this reason, in these cells, the self-discharge rate is comparatively low and, in addition, the cell thickness scarcely changes. Moreover, these room temperature molten salts have the inflammability or nonflammability so that these cells provide the excellent safety even in case of the abuse such as over-charging, over-discharging and short-circuiting etc. and under a high-temperature environment.

(Conclusion)

Since the above mentioned effects can be obtained synergistically, the invention cells P4, P5 & P6 present the high safety and excellent cell performance, as compared with the comparison cells C3 & C4.

EMBODIMENT 7

A nonaqueous electrolyte lithium secondary cell of this embodiment has the same fundamental structure as that of the Embodiment 1. As shown in FIG. 1, the cell is composed of the assembled element 4 comprising the positive electrode 1, the negative electrode 2 and the separator 3; the nonaqueous electrolyte; and the metal resin composite film 6. The positive electrode 1 is so formed that the cathode composite 11 is coated on one surface of the positive current collector 12. The negative electrode 2 is so formed that the anode composite 21 is coated on one surface of the negative current collector 22. The separator 3 is composed of a non-woven fabric made of polypropylene. The metal resin composite film 6 covers the assembled element 4, and is thermally jointed at its four sides to seal the assembled element 4. There are two types in the nonaqueous electrolyte: liquid-state type and solid-state type. The liquid-state nonaqueous electrolyte is contained in the cathode composite 11 and the anode composite 21, and the solid-state nonaqueous electrolyte is contained in the separator 3.

A method of manufacturing the nonaqueous electrolyte lithium secondary cell of this embodiment will be described hereunder.

The positive electrode 1 and the negative electrode 2 were prepared in the same procedure as that of the Embodiment 4.

The liquid-state nonaqueous electrolyte was obtained also in the same procedure as that of the Embodiment 4. 1 mol of $LiBF_4$ was dissolved in 1 L of room temperature molten salt ($EMIBF_4$) comprising 1-ethyl-3-methyl imidazolium ion ($EMI^+$) and tetrafluoroborate ion ($BF_4^-$).

The solid-state nonaqueous electrolyte was contained in the separator 3 as follows. In the first stage, the liquid-state nonaqueous electrolyte was prepared as described above. In the next stage, 1 gram of bifunctional acrylate monomer having a structure as shown by a Chemical formula (III) was completely dissolved in 9 grams of the liquid-state nonaqueous electrolyte, so that a monomer solution was obtained. The monomer solution was impregnated in the separator 3 which was irradiated with electron beam to polymerize the monomer solution. Thus, the solid-state nonaqueous electrolyte was contained in the separator 3.

Chemical formula (III)

The cathode composite 11 and the anode composite 21 were placed oppositely each other, and the separator 3 including the solid-state nonaqueous electrolyte as describe above was put between them. The negative electrode 2, the separator 3 and the positive electrode 1 were laminated so that the assembled element 4 was constructed.

Then, the assembled element 4 was dipped in the liquid-state nonaqueous electrolyte. Thus, the liquid-state nonaqueous electrolyte was impregnated into the cathode composite 11 and the anode composite 21.

The thus prepared cell is designated as an invention cell P7. A design capacity of the invention cell P7 is 10 mAh.

EMBODIMENT 8

1 mol of $LiBF_4$ was dissolved in 1 L of room temperature molten salt ($BPyBF_4$) comprising N-butylpiridinium ion ($BPy^+$) and $BF_4$, and this material was used for the nonaqueous electrolyte. The other procedure was the same as that of the invention cell P7, so that a nonaqueous electrolyte lithium secondary cell was prepared. This cell is designated as an invention cell P8.

EMBODIMENT 9

$Li_{4/3}Ti_{4/3}B_{1/3}O_4$ was used for the negative active material, and the other procedure was the same as that of the invention cell P7. Thus, a nonaqueous electrolyte lithium secondary cell was prepared. This cell is designated as an invention cell P9.

EMBODIMENT 10

$LiCoO_2$ was used for the positive active material, and the other procedure was the same as that of the invention cell P7. Thus, a nonaqueous electrolyte lithium secondary cell was prepared. This cell is designated as an invention cell P10.

COMPARISON EXAMPLE 5

1 mol of $LiBF_4$ was dissolved in 1 L of a mixed solvent comprising ethylene carbonate and diethyl carbonate which were mixed together by a volume ratio of 1:1, and this material was used for the nonaqueous electrolyte. The other procedure was the same as that of the invention cell P7, so that a nonaqueous electrolyte lithium secondary cell was prepared. This cell is designated as a comparison cell C5.

COMPARISON EXAMPLE 6

A graphite was used for the negative active material, and the other procedure was the same as that of the invention cell P7. Thus, a nonaqueous electrolyte lithium secondary cell was prepared. This cell is designated as a comparison cell C6.

(Performance Test)

(1) Charge/Discharge Cycle Test

The invention cells P7, P8, P9 & P10 and the comparison cells C5 & C6 were subjected to the same charge/discharge cycle test as described above.

[Result]

Figure 8:
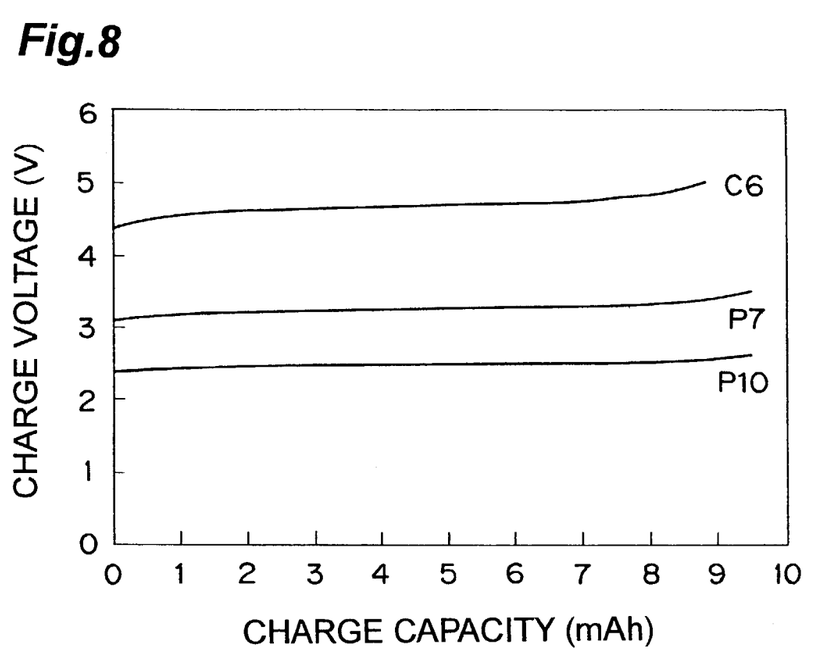
FIG. 8 is a diagram showing charge curves at initial stage of cycle for invention cells P7 & P10 and a comparison cell C6.
Figure 9:
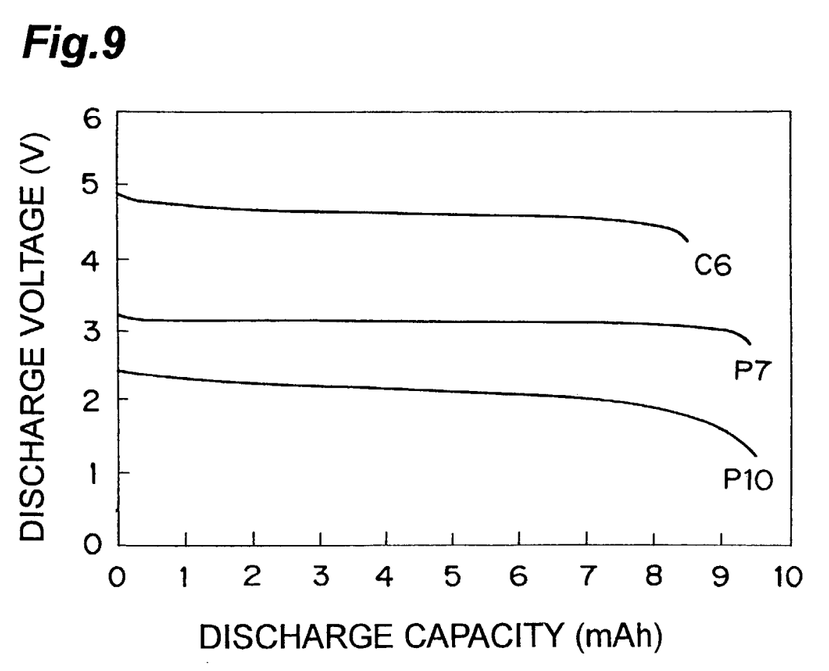
FIG. 9 is a diagram showing discharge curves at initial stage of cycle for invention cells P7 & P10 and a comparison cell C6.
Figure 10:
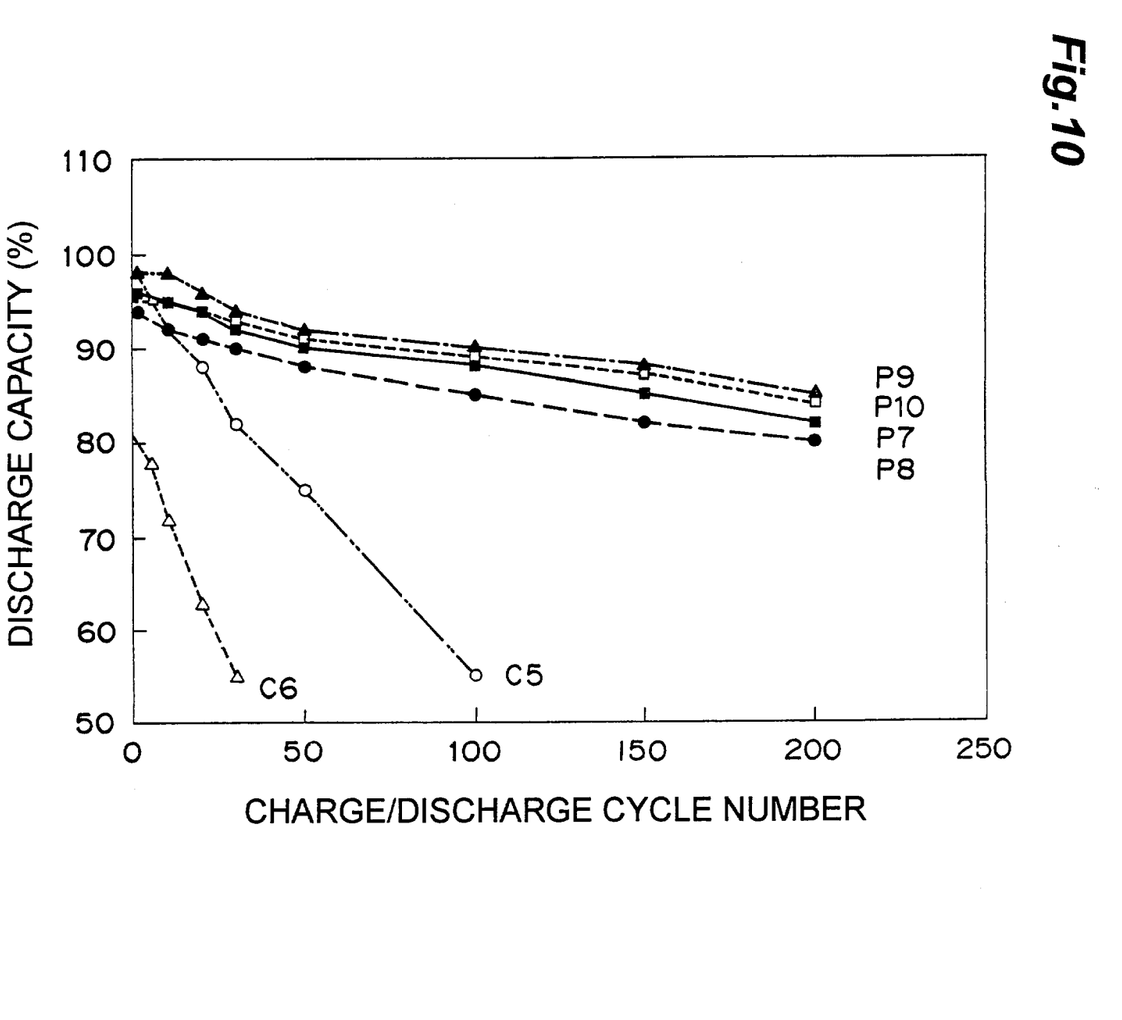
FIG. 10 is a diagram showing charge/discharge cycle characteristics for invention cells P7, P8, P9 & P10 and comparison cells C5 & C6.

FIG. 8 shows charge curves at initial stage of cycle for the invention cells P7 & P10 and the comparison cell C6. FIG. 9 shows discharge curves at initial stage of cycle for the invention cells P7 & P10 and the comparison cell C6. FIG. 10 shows charge/discharge cycle characteristics for the invention cells P7, P8, P9 & P10 and the comparison cells C5 & C6. A discharge capacity (%) means a ratio of a measured capacity to a cell design capacity.

As seen from FIG. 8 and FIG. 9, the comparison cell C6 provides a high discharge mean voltage as 4.5V, but provides a discharge capacity of only about 80% and a charge/discharge efficiency of only about 85%. On the other hand, the invention cell P7 provides a discharge capacity of about 100% and a charge/discharge efficiency of about 100%, and provides a high discharge mean voltage as 3.2V. The invention cell P10 provides a discharge capacity of about 100% and a charge/discharge efficiency of about 100%.

While, as seen from FIG. 10, the comparison cell C6 provides a discharge capacity of only about 80% even at the initial stage of charging and discharging, and the discharge capacity suddenly lowers with an increase in a cycle number and drops below 60% at $25^{th}$ cycle. The comparison cell C5 provides a discharge capacity of about 100% at the initial stage of charging and discharging, but the discharge capacity gradually lowers with an increase in a cycle number and drops below 60% at $85^{th}$ cycle. On the other hand, the invention cells P7, P8, P9 & P10 not only provide a discharge capacity of about 100% from the initial stage of charging and discharging, but can keep a discharge capacity of above 80% even after completion of 200 cycles.

The reason of this fact can be supposed as follows.

In the comparison cell C6, since the graphite which is one of the carbon material is used for the negative active material, a working potential of the negative electrode is equal to a potential of the metallic lithium (−3.045V vs. NHE in case of aqueous solution) and is very base. For this reason, the lithium in the negative active material under a charging condition of cell presents a high activity so as to reduce and decompose the quaternary ammonium organic cation in the electrolyte and the negative active material itself. As a result, the cycle characteristic and charge/discharge efficiency characteristic are worsened.

In the comparison cell C5, since $LiMn_{1.5}Ni_{0.5}O_4$ is used for the positive active material, a working potential of the positive electrode is nobler by about 4.7V than the potential of metallic lithium and is very noble. However, a material is used for the nonaqueous electrolyte, wherein 1 mol of $LiBF_4$ is dissolved in 1 L of mixed solvent formed by mixing ethylene carbonate and diethyl carbonate with a volume ratio of 1:1. Therefore, the solvent in the nonaqueous electrolyte under charged condition of cell is oxidized and decomposed. Consequently, the cycle characteristic and charge/discharge efficiency characteristic are worsened.

While, since the burnt oxide having the spinel type structure expressed by $Li_xTi_{5/3-y}L_yO_4$ is used for the negative active material in case of the invention cells P7, P8 & P9, a working potential of the negative electrode is nobler by about 1.5V than the potential of the metallic lithium. Therefore, the lithium in the negative active material under the charging condition of cell presents a low activity, as compared with the lithium in the metallic lithium and the carbon material, so that the function to reduce and decompose the electrolyte etc. becomes very small. Consequently, good cycle characteristic and charge/discharge efficiency characteristic can be obtained.

In the comparison cell C10, since $LiCoO_2$ is used for the positive active material, a working potential of the positive electrode is nobler by about 3.8V than the potential of metallic lithium and the mean discharge voltage of cell becomes 2.1V.

In the invention cells P7, P8 & P9 and the comparison cells C5 & C6; since $LiMn_{1.5}Ni_{0.5}O_4$ is used for the positive active material, a working potential of the positive electrode is nobler by about 4.7V than the potential of metallic lithium. The cell mean discharge voltage becomes such a high value as 3.2V in the invention cells P7, P8 & P9 and the comparison cell C5, and as 4.5V in the comparison cell C6. For this reason, a high energy density can be obtained.

(2) High-temperature Storage Test

The invention cells P7, P8, P9 & P10 and the comparison cells C5 & C6 were subjected to the same high-temperature storage test as described above.

[Result]

Table 3 shows results of the high-temperature storage test. As seen from Table 3, the comparison cell C5 presents not only a high self-discharge rate but also a large change of cell thickness. On the contrary, the invention cells P7, P8, P9 & P10 and the comparison cell C6 present not only a comparatively low self-discharge rate but also little change of cell thickness.

TABLE 3

| Cell | Discharge capacity before storage | Self-discharge rate | Change of cell thickness |
|---|---|---|---|
| Invention cell P7 | 9.6 mAh | 11.7% | +5% |
| Invention cell P8 | 9.4 mAh | 15.5% | +7% |
| Invention cell P9 | 9.8 mAh | 12.0% | +3% |
| Invention cell P10 | 9.5 mAh | 13.5% | +8% |

TABLE 3-continued

| Cell | Discharge capacity before storage | Self-discharge rate | Change of cell thickness |
|---|---|---|---|
| Comparison cell C5 | 9.8 mAh | 62.5% | +220% |
| Comparison cell C6 | 8.0 mAh | 28.2% | +15% |

(3) Heating Test

The invention cells P7, P8, P9 & P10 and the comparison cells C5 & C6 were subjected to the same heating test as described above.

[Result]

In the comparison cell C5, the aluminum laminated film was burnt and the electrolyte caught fire to cause an explosive burning. On the contrary, in the invention cells P7, P8, P9 & P10 and the comparison cell C6, the aluminum laminated film was burnt but no burning occurred on the electrolyte.

In the comparison cell C5, a material is used for the nonaqueous electrolyte, wherein 1 mol of $LiBF_4$ is dissolved in 1 L of mixed solvent formed by mixing ethylene carbonate and diethyl carbonate with a volume ratio of 1:1. These organic solvents are apt to vaporate and easily change to gas under the high-temperature storage. For this reason, the self-discharge rate becomes high and the change of the cell thickness becomes large. In addition, since these organic solvents have a high inflammability, the nonaqueous electrolyte is easily burnt by the heating test. Therefore, in the comparison cell C5, the safety of cell is not sufficiently secured in case of the abuse such as over-charging, over-discharging and short-circuiting etc. and under a high-temperature environment.

While, in the invention cells P7, P8, P9 & P10 and the comparison cell C6, the room temperature molten salt such as $EMIBF_4$ or $BPyBF_4$ etc. are used for the nonaqueous electrolyte. These room temperature molten salts present little volatility even in liquid-state at ordinary temperature, and is scarcely gasified even by the high-temperature storage. For this reason, the self-discharge rate is comparatively low and the cell thickness scarcely changes, in these cells. Moreover, these room temperature molten salts have the inflammability or nonflammability, so that these cells provide the excellent safety even in case of the abuse such as over-charging, over-discharging and short-circuiting etc. and under a high-temperature environment.

Furthermore, in the invention cells P7, P8, P9 & P10, since the solid-state nonaqueous electrolyte is contained in the separator 3, a fluidity of the nonaqueous electrolyte in the separator 3 is controlled and a possibility of leakage of the electrolyte is reduced. Consequently, the safety of the invention cells P7, P8, P9 & P10 can be secured more excellently.

In addition, the cathode composite 11 and the anode composite 21 contain the liquid-state nonaqueous electrolyte and do not contain the solid-state nonaqueous electrolyte. Therefore, an ion oxidation-reduction reaction speed on the electrode active material surface in the cathode composite 11 and the anode composite 21 becomes large, and an ion conduction phase prevails deeply into the porous electrode active material, as compared with a case where the cathode composite 11 or the anode composite 21 contains the solid-state nonaqueous electrolyte. Consequently, the cell performances of the invention cells P7, P8, P9 & P10 are kept at a sufficiently level and become stable and service lives of them are prolonged.

(Conclusion)

Since the foregoing effects can be obtained synergistically, the invention cells P7, P8, P9 & P10 provide the high safety and excellent cell performance, as compared with the comparison cells C5 & C6.

The invention claimed is:

1. A nonaqueous electrolyte lithium secondary cell comprising a nonaqueous electrolyte containing a lithium salt, a positive electrode, a negative electrode and a separator wherein, a material which contains a room temperature molten salt as a main component and is in liquid-state, is provided as the nonaqueous electrolyte, the negative electrode contains a negative active material wherein a working potential of the negative electrode is nobler by above 1V than a potential of a metallic lithium, the positive electrode contains a positive active material wherein a working potential of the positive electrode is nobler by above 4.5V than a potential of the metallic lithium, wherein the main component of the positive active material comprises a burnt oxide having the spinel type structure expressed by $Li_m[Ni_{2-n}M_nO_4]$ (M is a transition metal of one or more kinds and an element other than Ni, $0 \leq m \leq 1.1$, $0.75 \leq n \leq 1.80$), and the foregoing liquid-state nonaqueous electrolyte is contained in the positive electrode, the negative electrode and the separator.

2. A nonaqueous electrolyte lithium secondary cell comprising a nonaqueous electrolyte containing a lithium salt, a positive electrode, a negative electrode and a separator wherein;

a material which contains a room temperature molten salt as a main component and is in liquid-state, is provided as the nonaqueous electrolyte, and a material which contains a room temperature molten salt as a main component and is in solid-state by combining a polymer, is provided as the nonaqueous electrolyte, the negative electrode contains a negative active material wherein a working potential of the negative electrode is nobler by above 1V than a potential of a metallic lithium, the positive electrode contains a positive active material wherein a working potential of the positive electrode is nobler by above 4.5V than a potential of the metallic lithium, wherein the main component of the positive active material comprises a burnt oxide having the spinel type structure expressed by $Li_m[Ni_{2-n}M_nO_4]$ (M is a transition metal of one or more kinds and an element other than Ni, $0 \leq m \leq 1.1$, $0.75 \leq n \leq 1.80$), the foregoing liquid-state nonaqueous electrolyte is contained in the positive electrode and the negative electrode, and the foregoing solid-state nonaqueous electrolyte is contained in the separator.

3. A nonaqueous electrolyte lithium secondary cell comprising a nonaqueous electrolyte containing a lithium salt, a positive electrode, a negative electrode and a separator characterized by that;

a material which contains a room temperature molten salt as a main component and is in liquid-state, is provided as the nonaqueous electrolyte, the negative electrode contains a negative active material wherein a working potential of the negative electrode is nobler by above 1V than a potential of a metallic lithium, wherein the main component of the negative active material comprises a burnt oxide having a spinel type structure expressed by $Li_xTi_{5/3-y}L_yO_4$ (L is an element belonging to 2 to 16 groups of one or more kinds, and an element other than Ti and O, $4/3<x<7/3$, $0<y<5/3$), and the foregoing liquid-state nonaqueous electrolyte is contained in the positive electrode, the negative electrode and the separator.

4. A nonaqueous electrolyte lithium secondary cell comprising a nonaqueous electrolyte containing a lithium salt, a positive electrode, a negative electrode and a separator characterized by that;

a material which contains a room temperature molten salt as a main component and is in liquid-state, is provided as the nonaqueous electrolyte, and a material which contains a room temperature molten salt as a main component and is in solid-state by combining a polymer, is provided as the nonaqueous electrolyte, the negative electrode contains a negative active material wherein a working potential of the negative electrode is nobler by above 1V than a potential of a metallic lithium, wherein the main component of the negative active material comprises a burnt oxide having a spinel type structure expressed by $Li_xTi_{5/3-y}L_yO_4$ (L is an element belonging to 2 to 16 groups of one or more kinds, and an element other than Ti and O, $4/3<x<7/3$, $0<y<5/3$), the foregoing liquid-state nonaqueous electrolyte is contained in the positive electrode and the negative electrode, and the foregoing solid-state nonaqueous electrolyte is contained in the separator.

5. A nonaqueous electrolyte lithium secondary cell comprising a nonaqueous electrolyte containing a lithium salt, a positive electrode, a negative electrode and a separator wherein, a material which contains a room temperature molten salt as a main component and is in liquid-state, is provided as the nonaqueous electrolyte, the negative electrode contains a negative active material wherein a working potential of the negative electrode is nobler by above 1V than a potential of a metallic lithium, wherein the main component of the negative active material comprises a burnt oxide having a spinel type structure expressed by $Li_xTi_{5/3-y}L_yO_4$ (L is an element belonging to 2 to 16 groups of one or more kinds, and an element other than Ti and O, $4/3<x<7/3$, $0<y<5/3$), the positive electrode contains a positive active material wherein a working potential of the positive electrode is nobler by above 4.5V than a potential of the metallic lithium, wherein the main component of the positive active material comprises a burnt oxide having the spinel type structure expressed by $Li_m[Ni_{2-n}M_nO_4]$ (M is a transition metal of one or more kinds and an element other than Ni, $0\leq m\leq 1.1$, $0.75\leq n\leq 1.80$), and the foregoing liquid-state nonaqueous electrolyte is contained in the positive electrode, the negative electrode and the separator.

6. A nonaqueous electrolyte lithium secondary cell comprising a nonaqueous electrolyte containing a lithium salt, a positive electrode, a negative electrode and a separator wherein;

a material which contains a room temperature molten salt as a main component and is in liquid-state, is provided as the nonaqueous electrolyte, and a material which contains a room temperature molten salt as a main component and is in solid-state by combining a polymer, is provided as the nonaqueous electrolyte, the negative electrode contains a negative active material wherein a working potential of the negative electrode is nobler by above 1V than a potential of a metallic lithium, wherein the main component of the negative active material comprises a burnt oxide having a spinel type structure expressed by $Li_xTi_{5/3-y}L_yO_4$ (L is an element belonging to 2 to 16 groups of one or more kinds, and an element other than Ti and O, $4/3<x<7/3$, $0<y<5/3$), the positive electrode contains a positive active material wherein a working potential of the positive electrode is nobler by above 4.5V than a potential of the metallic lithium, wherein the main component of the positive active material comprises a burnt oxide having the spinel type structure expressed by $Li_m[Ni_{2-n}M_nO_4]$ (M is a transition metal of one or more kinds and an element other than Ni, $0\leq m\leq 1.1$, $0.75\leq n\leq 1.80$), the foregoing liquid-state nonaqueous electrolyte is contained in the positive electrode and the negative electrode, and the foregoing solid-state nonaqueous electrolyte is contained in the separator.

7. A nonaqueous electrolyte lithium secondary cell as set forth in any one of claims 1–6, in which the room temperature molten salt contains a quaternary ammonium organic cation having a skeleton expressed by a Chemical formula (I)

Chemical formula (I)

8. A nonaqueous electrolyte lithium secondary cell as set forth in any one of claims 1–6, in which the room temperature molten salt contains an imidazolium cation having a skeleton expressed by a Chemical formula (II)

Chemical formula (II)

(R1, R2: $C_nH_{2n+1}$, n=1~6
R3: H or $C_nH_{2n+1}$, n=1~6)

* * * * *